United States Patent
Komaki

(10) Patent No.: US 9,148,229 B2
(45) Date of Patent: Sep. 29, 2015

(54) OPTICAL TRANSMITTER, OPTICAL RECEIVER, AND OPTICAL TRANSMISSION METHOD

(71) Applicant: FUJITSU LIMITED, Kawasaki-shi, Kanagawa (JP)

(72) Inventor: Kosuke Komaki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 276 days.

(21) Appl. No.: 13/779,791

(22) Filed: Feb. 28, 2013

(65) Prior Publication Data

US 2013/0259478 A1    Oct. 3, 2013

(30) Foreign Application Priority Data

Mar. 28, 2012 (JP) ................. 2012-074942

(51) Int. Cl.
- *H04B 10/20* (2006.01)
- *H04B 10/516* (2013.01)
- *H04B 10/67* (2013.01)
- *H04B 10/61* (2013.01)

(52) U.S. Cl.
CPC ............ *H04B 10/516* (2013.01); *H04B 10/614* (2013.01); *H04B 10/67* (2013.01)

(58) Field of Classification Search
CPC .... H04B 10/516; H04B 10/614; H04B 10/67; H04J 3/0605; H04J 3/1652
USPC .......................................................... 398/58
See application file for complete search history.

(56) References Cited

U.S. PATENT DOCUMENTS

| | | | | |
|---|---|---|---|---|
| 6,160,651 A | * | 12/2000 | Chang et al. | 398/79 |
| 8,165,191 B2 | * | 4/2012 | Vijayaraghavan et al. | 375/222 |
| 8,495,475 B2 | * | 7/2013 | Kubo et al. | 714/776 |
| 8,732,375 B1 | * | 5/2014 | Vijayaraghavan et al. | 710/305 |
| 8,744,262 B2 | * | 6/2014 | Barnard | 398/49 |
| 8,848,747 B2 | * | 9/2014 | Zeng et al. | 370/509 |
| 2010/0158518 A1 | * | 6/2010 | Shin et al. | 398/45 |
| 2010/0281343 A1 | * | 11/2010 | Caggioni et al. | 714/776 |
| 2010/0329694 A1 | * | 12/2010 | Frankel | 398/159 |
| 2011/0013911 A1 | * | 1/2011 | Alexander et al. | 398/79 |
| 2011/0020012 A1 | * | 1/2011 | Miyasaka et al. | 398/202 |
| 2011/0150477 A1 | * | 6/2011 | Winzer | 398/65 |
| 2011/0150478 A1 | * | 6/2011 | Winzer | 398/65 |
| 2011/0150503 A1 | * | 6/2011 | Winzer | 398/202 |
| 2011/0206204 A1 | * | 8/2011 | Sychev | 380/256 |

(Continued)

FOREIGN PATENT DOCUMENTS

JP    9-55713    2/1997

*Primary Examiner* — Ken Vanderpuye
*Assistant Examiner* — Abbas H Alagheband
(74) *Attorney, Agent, or Firm* — Staas & Halsey LLP

(57) ABSTRACT

There is provided an optical transmitter including: a demultiplexer configured to divide a data frame of a transmission signal into subframes with a predetermined length so as to form the subframes in a plurality of signal lanes; an index generator configured to generate an index for indicating an order of the signal lanes; a lane rearrangement unit configured to rearrange the order of the signal lanes according to the index; a carrier controller configured to generate a frequency offset of a carrier corresponding to the index; a mapping unit configured to map the transmission signal in the plurality of signal lanes with the rearranged order to the transmission signal with a phase corresponding to the frequency offset; and a transmitting unit configured to optically modulate the mapped transmission signal so as to transmit the modulated transmission signal.

19 Claims, 21 Drawing Sheets

(56) References Cited

U.S. PATENT DOCUMENTS

| | | | |
|---|---|---|---|
| 2012/0087346 A1* | 4/2012 | Lee et al. | 370/335 |
| 2012/0128368 A1* | 5/2012 | Onohara et al. | 398/135 |
| 2012/0134676 A1* | 5/2012 | Kikuchi | 398/65 |
| 2012/0141116 A1* | 6/2012 | Zeng et al. | 398/1 |
| 2012/0155486 A1* | 6/2012 | Ahn et al. | 370/433 |
| 2012/0183303 A1* | 7/2012 | Onohara et al. | 398/136 |
| 2012/0189322 A1* | 7/2012 | Mo et al. | 398/188 |
| 2012/0315043 A1* | 12/2012 | Nakagawa et al. | 398/65 |
| 2013/0070786 A1* | 3/2013 | Liu et al. | 370/464 |
| 2013/0148965 A1* | 6/2013 | Losio et al. | 398/65 |
| 2013/0236169 A1* | 9/2013 | Gaudette et al. | 398/25 |
| 2014/0286650 A1* | 9/2014 | Ogiwara | 398/208 |

\* cited by examiner

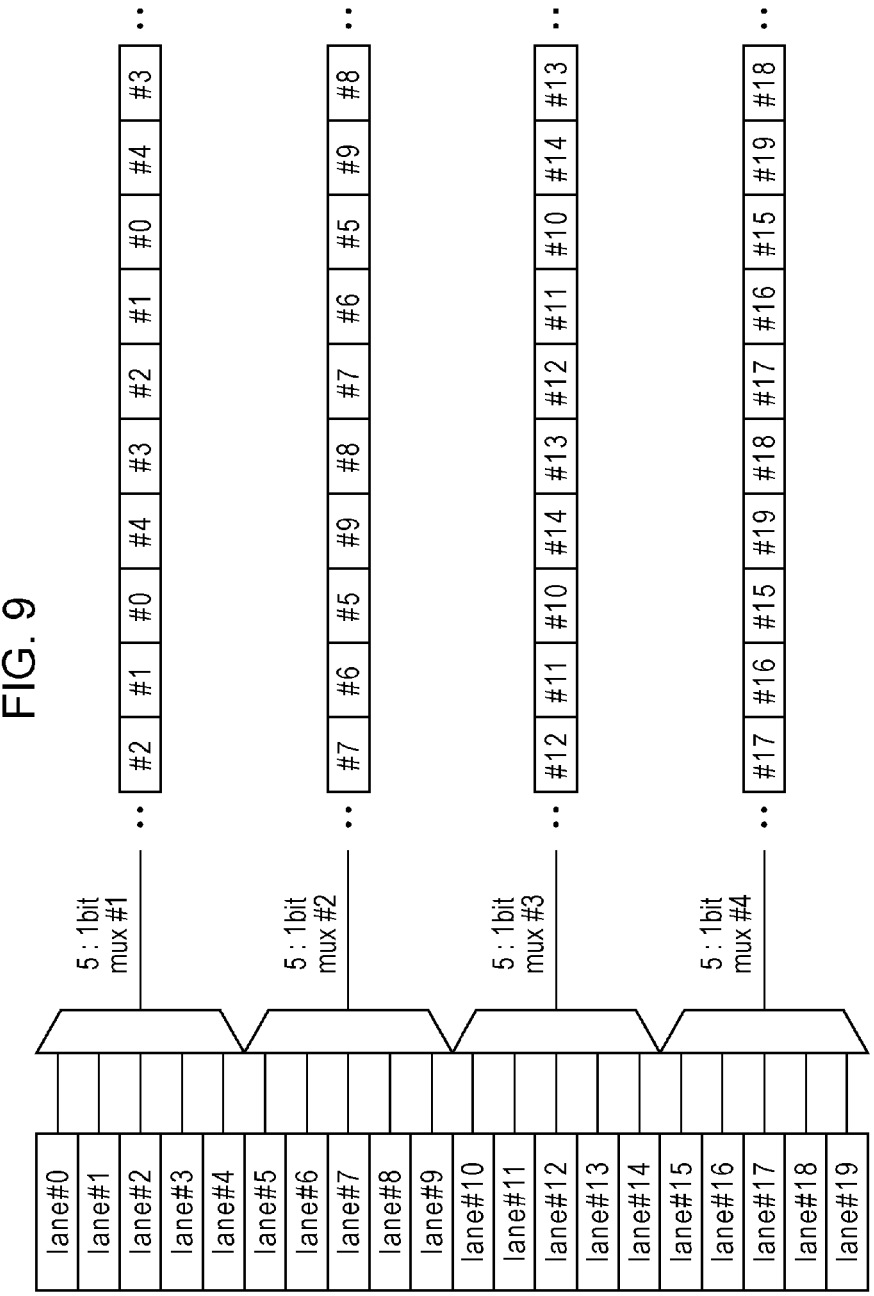

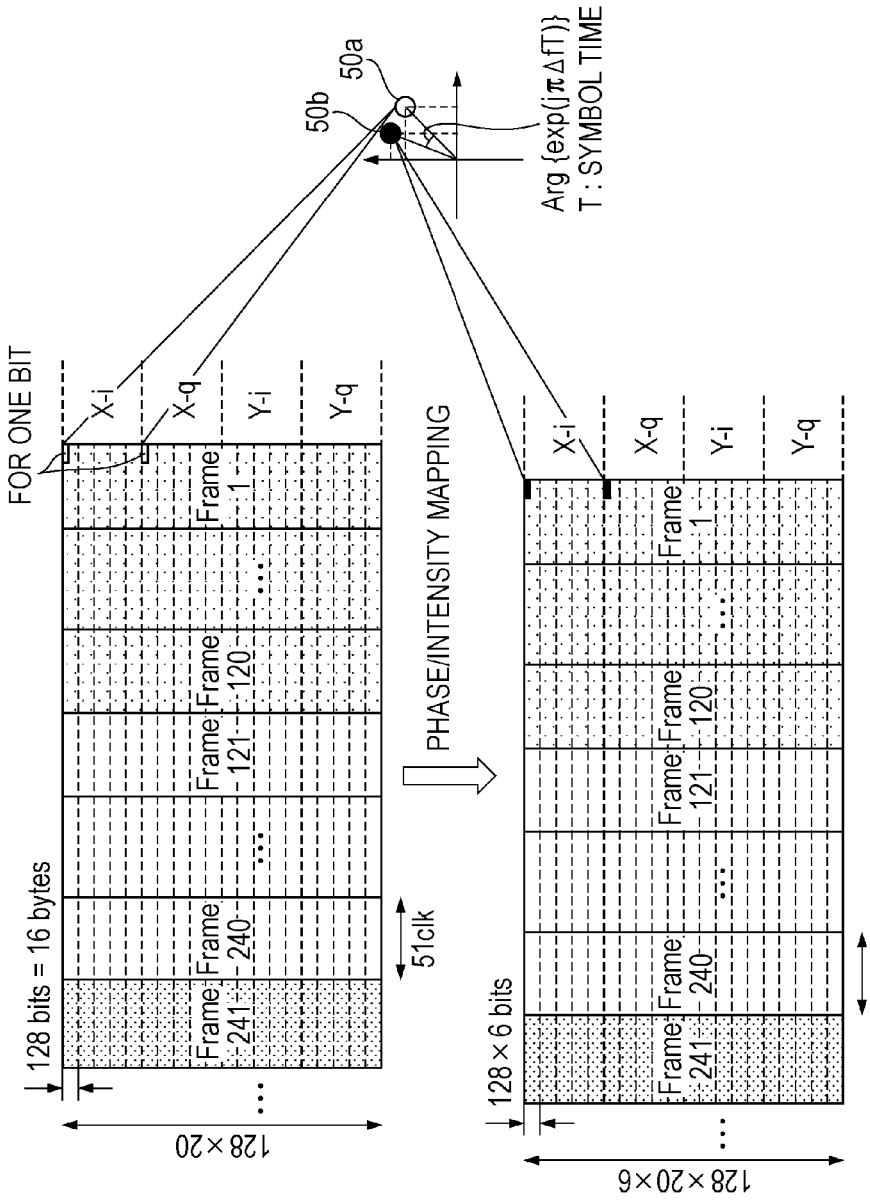

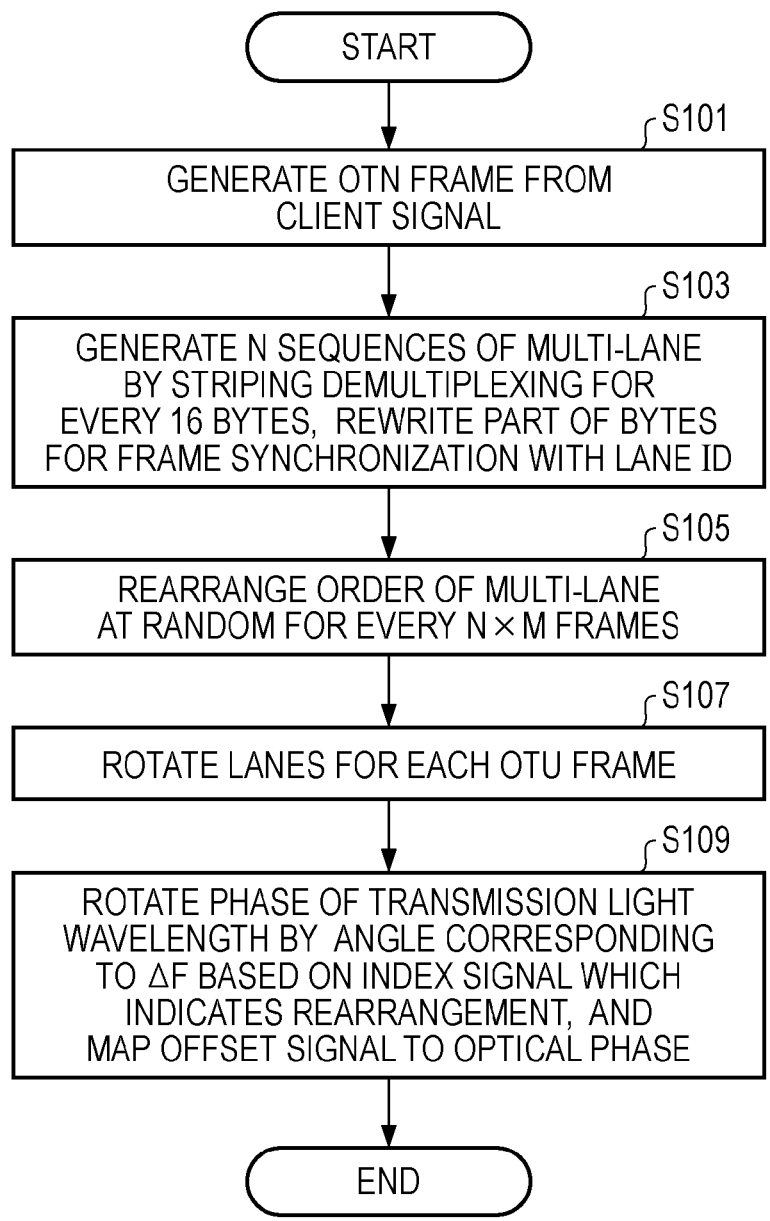

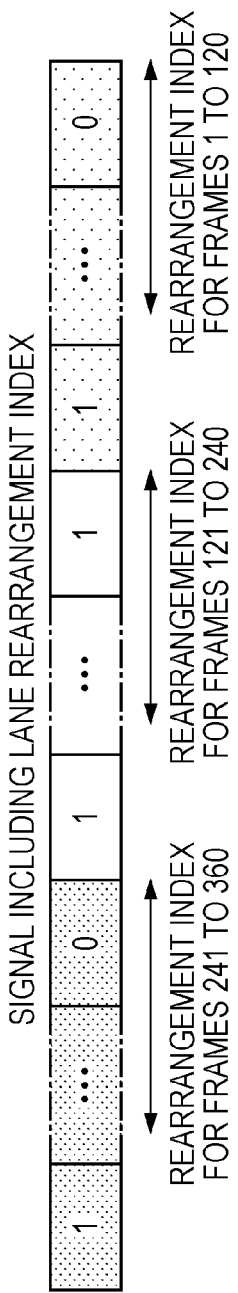

DATA AFTER FREQUENCY OFFSET REMOVAL

DATA AFTER DETERMINATION

OPTICAL TRANSMITTER, OPTICAL RECEIVER, AND OPTICAL TRANSMISSION METHOD

CROSS-REFERENCE TO RELATED APPLICATION

This application is based upon and claims the benefit of priority of the prior Japanese Patent Application No. 2012-074942, filed on Mar. 28, 2012, the entire contents of which are incorporated herein by reference.

FIELD

The embodiment discussed herein is related to an optical transmitter, a light receiver, and an optical transmission method.

BACKGROUND

End-to-end application via LAN (Local Area Network) or SAN (Storage Area Network) has been demanded to have high security and low latency. There is known a method by which encoding is performed while changing a synchronization bit pattern as desired in order to ensure reliability of end-to-end communication (for example, see Japanese Laid-open Patent Publication No. 9-55713). Because a receiving end receives a notification of the bit pattern from a transmitting end, the receiving end may read data in a frame-synchronous manner. Conversely, when the bit pattern is not known, frame synchronization is not achieved, and thus data may not be read.

By sending a plurality of bit patterns previously, encoding may be performed using frame synchronization according to the bit patterns. However, when the bit pattern is changed regularly, a synchronization bit pattern changing convention may be detected by monitoring the bit pattern, and thus the reliability of the encoding decreases.

When information resources are transmitted and received between data centers using an optical fiber, there is a problem in that it is difficult to increase the security level. Because a passive optical monitoring device such as an optical coupler is available at a low price, there is a concern that unauthorized branching of the fiber may be performed depending on an accessible region of the fiber. It is even difficult to detect such an unauthorized branching. Thus, it is desirable to develop a method for improving the security level other than just detecting and protecting against unauthorized branching of the fiber.

For example, there is a method utilizing an upper layer. In Internet Protocol Security Virtual Private Network (IPSec-VPN) using layer 3, data is encoded in encapsulation of a packet in VPN communication, and thus even if the communication line is wiretapped, the content or the sender of the data may not be identified. In addition, there is also a technique known as Secure Socket Layer Virtual Private Network (SSL-VAN) using layer 5.

SUMMARY

According to an aspect of the invention, an optical transmitter includes: a demultiplexer configured to divide a data frame of a transmission signal into subframes with a predetermined length so as to form the subframes in a plurality of signal lanes; an index generator configured to generate an index for indicating an order of the signal lanes; a lane rearrangement unit configured to rearrange the order of the signal lanes according to the index; a carrier controller configured to generate a frequency offset of a carrier corresponding to the index; a mapping unit configured to map the transmission signal in the plurality of signal lanes with the rearranged order to the transmission signal with a phase corresponding to the frequency offset; and a transmitting unit configured to optically modulate the mapped transmission signal so as to transmit the modulated transmission signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an example of an output from the frame former in FIG. 3;

FIG. 11 illustrates an example of a phase/intensity mapping based on a frequency offset;

FIG. 12 is a flowchart illustrating signal processing performed by a transmission signal processing unit in FIG. 1;

FIGS. 14A to 14C illustrate a frequency offset signal extracted by the reception signal processing unit in FIG. 2, differentiation extracted by the reception signal processing unit in FIG. 2, and a lane forming index signal extracted by the reception signal processing unit in FIG. 2, respectively;

FIG. 17 illustrates an example of skew correction with a lane ID;

FIG. 18 illustrates an example of lane rearrangement with a lane ID;

DESCRIPTION OF EMBODIMENT

A data concealing method using an upper layer takes processing time for encapsulating and encoding data, decoding and decapsulating encoded data, and thus is not suitable for the service of LAN or SAN for which low latency is demanded. In addition, a large amount data is buffered for save processing time, and thus the power consumption also increases.

Hereinafter, an optical transmitter, an optical receiver, and a signal transmitting and receiving method which may achieve both security and low latency by signal processing utilizing a low layer (such as layer 0, layer 1) will be described.

Figure 1:
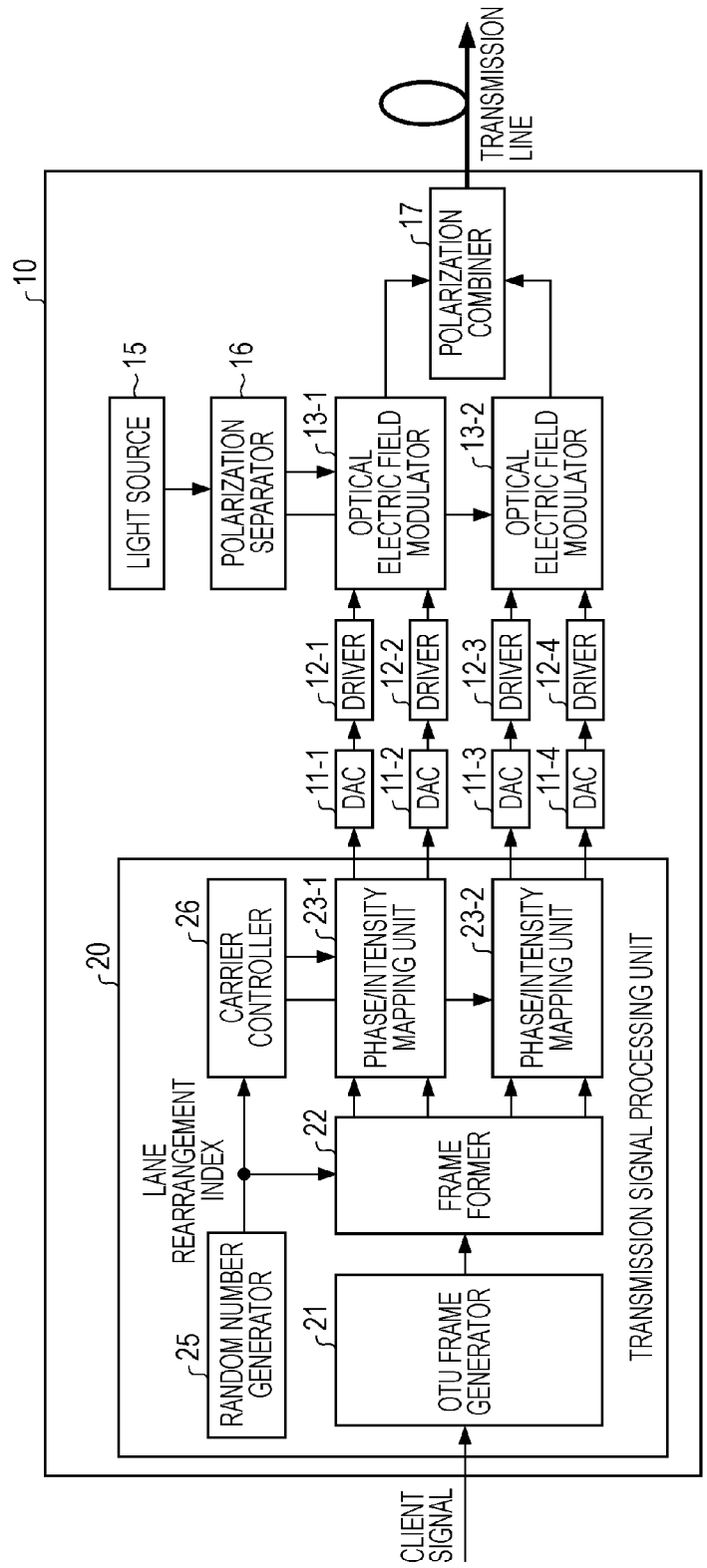
FIG. 1 is a schematic configuration diagram of an optical transmitter according to an embodiment.

FIG. 1 is a schematic configuration diagram of an optical transmitter 10 according to an embodiment. The optical transmitter 10 includes a transmission signal processing unit 20, digital-to-analog converters (DAC) 11-1 to 11-4, drivers 12-1 and 12-4, optical electric field modulators 13-1 and 13-2, a light source 15, a polarization separator 16, and a polarization combiner 17. The DACs 11-1 to 11-4, the drivers 12-1 to 12-4, the optical electric field modulators 13-1 and 13-2, the light source 15, the polarization separator 16, a the polarization combiner 17 constitute an optical signal transmitting unit.

The transmission signal processing unit 20 performs digital signal processing including data encoding, on an inputted client signal. The DACs 11-1 to 11-4 each converts a digital signal outputted from the transmission signal processing unit 20 to an analog signal. The drivers 12-1 to 12-4 each generate an electrical drive signal according to an inputted analog signal, and drive the optical electric field modulators 13-1 and 13-2, respectively. The polarization separator 16 separates light from the light source 15 into two perpendicular polarized components, and inputs the two components to the optical electric field modulators 13-1 and 13-2, respectively. The optical electric field modulators 13-1 and 13-2 modulate the electric fields of the respective polarized components with a drive signal, and generate two optical signals. The polarization combiner 17 combines the two optical signals to an optical transmission line.

The transmission signal processing unit 20 includes an OTU frame generator 21, a frame former 22, a phase/intensity mapping units 23-1 and 23-2, a random number generator 25, and a carrier controller 26. The OTU frame generator 21 generates from a client signal an OTU (Optical channel Transport Unit) frame which conforms to OTN (Optical Transport Network) standard.

The frame former 22 generates N sequences of multi-lane from the OTU frame by striping/demultiplexing for every 16 bytes in accordance with, for example, G.709 standard function, and replaces part of the bytes for frame synchronization with a lane ID. For transfer at a rate of the order of 100 Gbps in e.g., digital coherent, multi-lane transfer is used in which lane distribution is performed every 16 bytes not every OTU frame bit distribution signal sequence.

The characteristic operation of the frame former 22 in the embodiment is to rearrange the order of the multi-lane for every N×M frames at random so as to provide concealment in data transmission. Because there are N! ways of arranging the multi-lane, the frame former 22 rearranges the lanes based on the index (lane rearrangement index) indicating an arrangement. The details of the operation will be described below.

The frame former 22 rotates the rearranged lane for each frame, and distributes a byte for frame synchronization and a lane ID to all lanes. The frame former 22 then multiplexes N sequences of lane to 4 digital signal sequences, and supplies the digital signal sequences to the phase/intensity mapping units 23-1 and 23-2.

The random number generator 25 generates a lane rearrangement index, and supplies the generated index to the frame former 22 and the carrier controller 26. As described above, the frame former 22 rearranges the order of N sequences of lane at random according to a lane rearrangement index. The carrier controller 26 generates a frequency offset Δf corresponding to the lane rearrangement index, and supplies the frequency offset Δf to the phase/intensity mapping units 23-1 and 23-2.

The phase/intensity mapping units 23-1 and 23-2 map the data outputted from the frame former 22 to a data signal with a phase corresponding to the frequency offset Δf. Thus, finally, an optical signal transmitted from the optical transmitter 10 includes the lane rearrangement index as a frequency offset (phase rotation of the wavelength of transmitted light). That is to say, a data signal is transmitted with a signal indicating the lane rearrangement index superimposed on the data signal.

Figure 2:
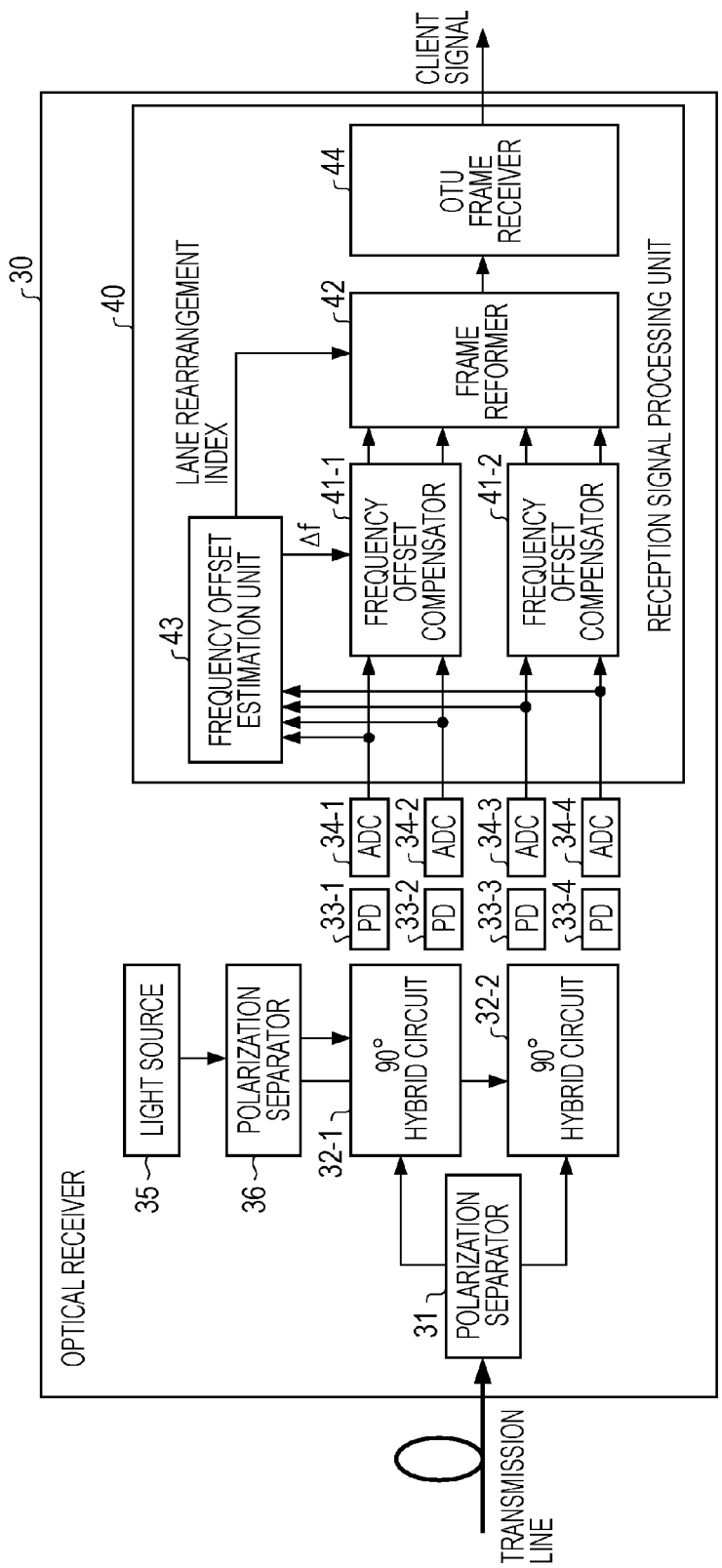
FIG. 2 is a schematic configuration diagram of an optical receiver according to the embodiment.

FIG. 2 is a schematic configuration diagram of an optical receiver 30 according to the embodiment. The optical receiver 30 includes a polarization separator 31, optical 90° hybrid circuits 32-1 and 32-2, photodetectors (PD) 33-1 to 33-4, analog-to-digital converters (ADC) 34-1 to 34-4, a light source 35, a polarization separator 36, and a reception signal processing unit 40. The polarization separator 31, the optical 90° hybrid circuits 32-1 and 32-2, the photodetectors (PD) 33-1 to 33-4, the ADCs 34-1 to 34-4, the light source 35, the polarization separator 36 constitute an optical signal receiving unit.

The polarization separator 31 separates a received optical signal into two perpendicular optical signals, and inputs the two optical signals to the optical 90° hybrid circuits 32-1 and 32-2, respectively. The polarization separator 36 branches the light from the light source (station dispatch) 35, and inputs the branched light to the optical 90° hybrid circuits 32-1 and 32-2 as reference light. The optical 90° hybrid circuits 32-1 and 32-2 each combine the polarized components and the reference light of a received light, and separates to perpendicular polarized components (X/Y polarization) and perpendicular phase components (I/Q channel). The PDs 33-1 to 33-4 each convert an optical signal to an analog electrical signal. The ADCs 34-1 to 34-4 each convert the analog signal to a digital signal, and supplies the digital signal to the reception signal processing unit 40.

The reception signal processing unit 40 includes a frequency offset estimation unit 43, frequency offset compensators 41-1 and 41-2, a frame reformer 42, and an OTU frame receiver 44. The frequency offset estimation unit 43 calculates a frequency offset of a received light based on an input digital signal. Any generally known method may be used as a method for estimating a frequency offset. For example, an input signal is delayed by just one symbol time using a delay element (not illustrated), and the subsequent input signal is multiplied by the complex conjugate of the delayed signal. Accordingly, the difference between the optical phases of the nth symbol and the (n+1)th symbol is calculated, and the phase change amount per symbol time may be determined. The average of the phase change amounts over a plurality of symbols may be calculated, then a noise component may be removed. The frequency offset is supplied to the frequency offset compensators 41-1 and 41-2, so that the offset of a receive signal is removed. The frequency offset includes an offset amount (phase rotation) indicating the lane rearrangement index given by the transmitting end, and so the frequency offset estimation unit 43 calculates the phase rotation and extracts the lane rearrangement index signal. The lane rearrangement index signal is supplied to the frame reformer 42.

The frequency offset compensators 41-1 and 41-2 each multiply an input digital signal by a compensation value based on the frequency offset so as to compensate the frequency offset. The compensation value is expressed by exp $(-\theta_{OFF})$ when the frequency offset, i.e., phase rotation is denoted by $\theta_{OFF}$, for example. The frame reformer 42 arranges the frame in N sequences of lane in the order of lane ID using frame synchronization, and de-rotates the lane ("de-rotate" is defined to undo the original rotation herein). The frame reformer 42 then reconstructs the original order of the lane according to inputted lane rearrangement index, converts N sequences of parallel data to serial data, and supplies the serial data to the OTU frame receiver 44.

With the above configuration of the optical transmitter 10 and the optical receiver 30, concealment using the layers 0, 1 is achieved, and thus both data concealment and low latency are achieved.

<Signal Processing of Transmitting Device>

Figure 3:
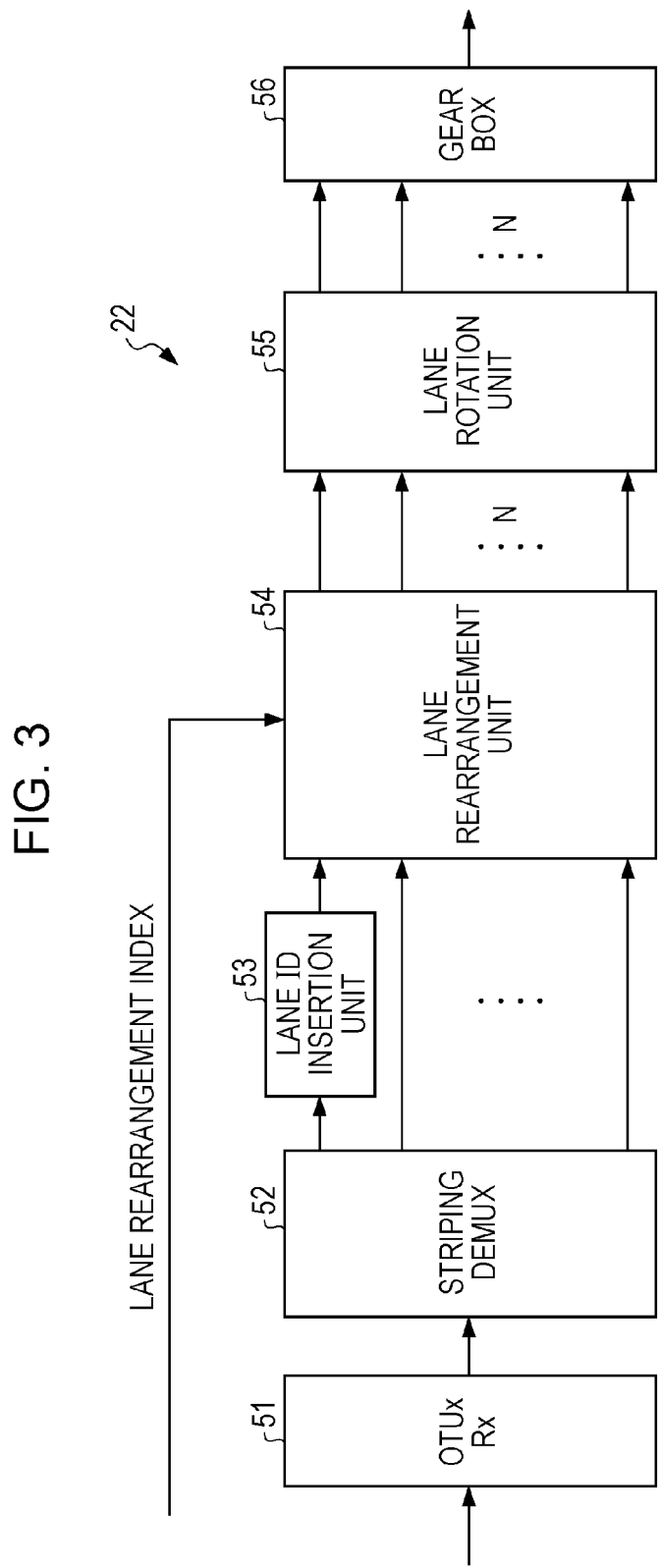
FIG. 3 is a schematic configuration diagram of a frame former of the optical transmitter of FIG. 1.

Next, the operation of the transmission signal processing unit 20 of the optical transmitter 10 in FIG. 1 will be described with reference to FIGS. 3 to 12. FIG. 3 is a block diagram illustrating the configuration of the frame former 22. The frame former 22 includes an OTU frame receiver (OTUxRx) 51, a striping demultiplexer 52, a lane ID insertion unit 53, a lane rearrangement unit 54, a lane rotation unit 55, and an N:4 gearbox 56.

Figure 4:
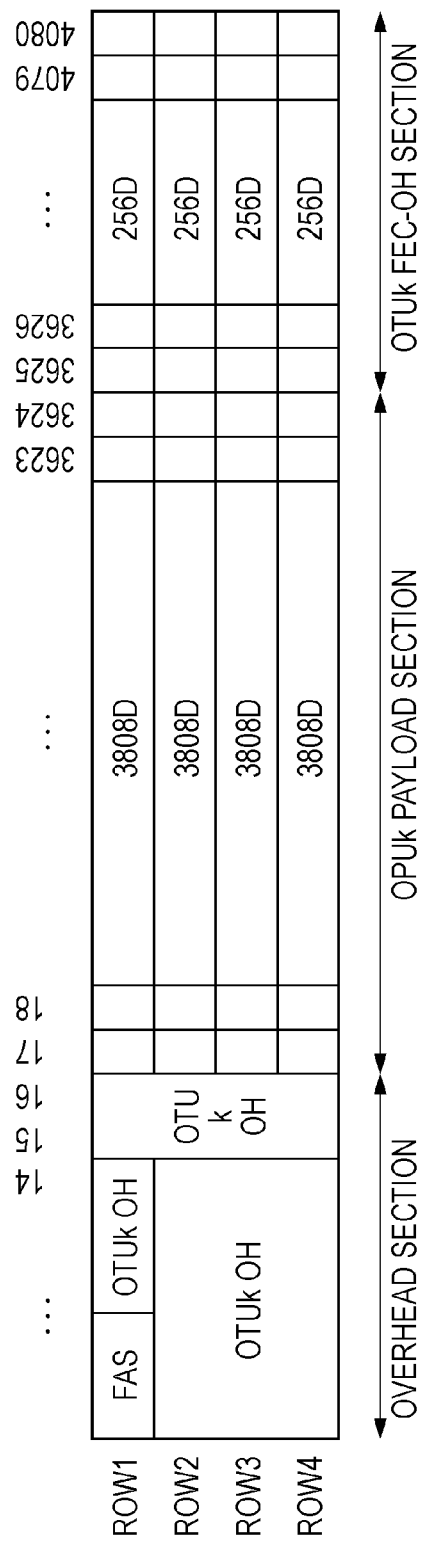
FIG. 4 illustrates an example of frame configuration of a signal which is inputted to a striping demultiplexer of the frame former of FIG. 3.

The OTU frame receiver 51 receives an OTU (Optical-channel Transport Unit) frame from the OTU frame generator 21, and inputs the OTU frame to the striping demultiplexer 52. FIG. 4 illustrates a configuration example of an OTU frame which is inputted to the striping demultiplexer 52. Client data is stored in an OTU payload section which is located between an overhead section and an error correction byte (FEC). The overhead section stores a control signal.

The striping demultiplexer 52 stripes/demultiplexes an OTU frame every 16 bytes into N sequences of multi-lane. Here, N is a factor of "the total number of bytes/16". When the multi-lane is divided into, for example, 4 groups for group processing, it is desirable that N is a multiple of 4. Assuming that the total number of bytes is 16320, N is chosen such that N is a factor of (16320/16) and a multiple of 4. In the above case, candidates for N include 4, 12, and 20. An embodiment will be described, in which N=20, and thus 20 sequences of multi-lane are formed.

Figure 5:
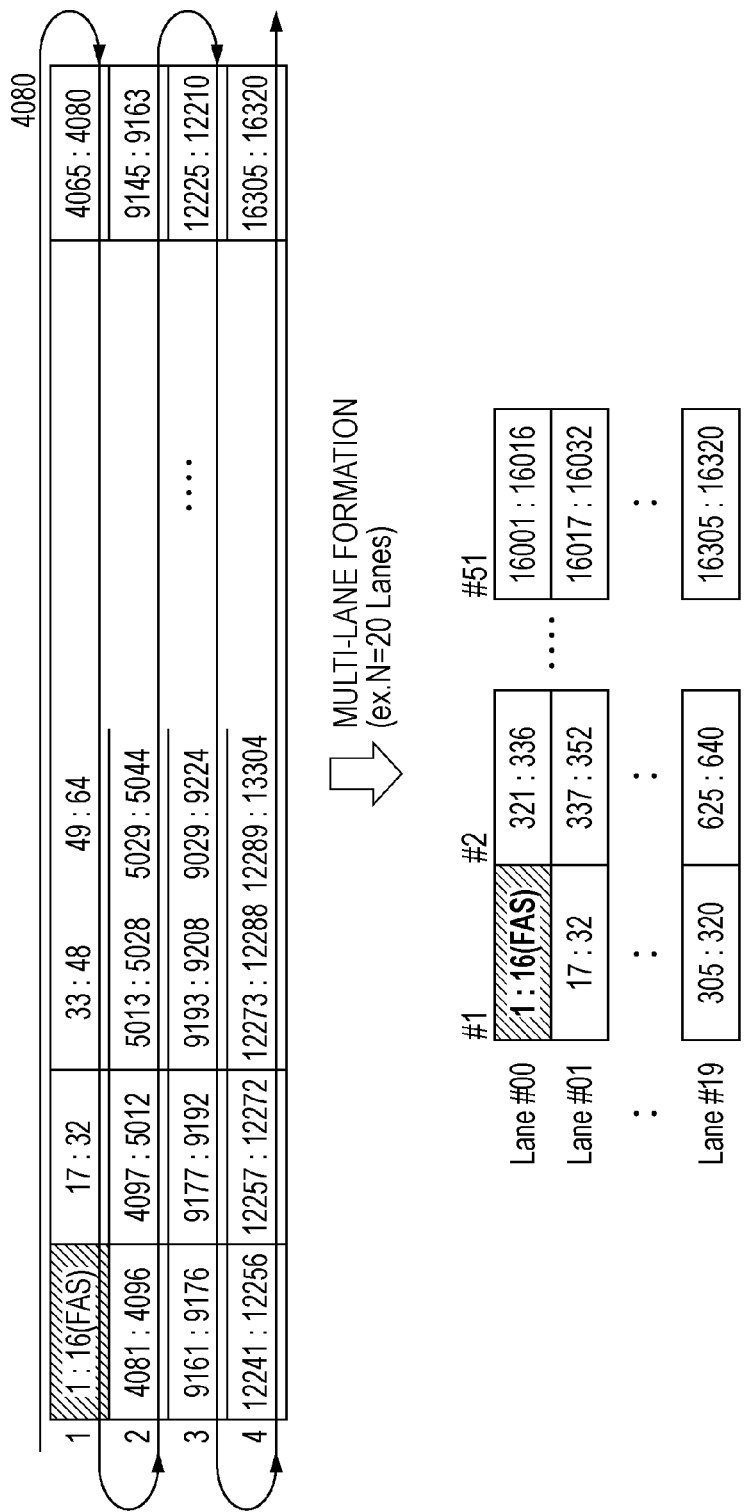
FIG. 5 illustrates an example of the configuration of a signal which is formed in a multi-lane by the striping demultiplexer.

FIG. 5 illustrates an example of OTU frame, in which an OTU4 frame is divided. The OTU4 frame is divided at every 16 bytes, and is distributed to each lane (lane #00 to lane #19) in the order of the arrow. After respective 16 bytes are distributed to lane #00 to lane #19, the distribution process is returned to the lane #00 and is repeated.

Figure 6:
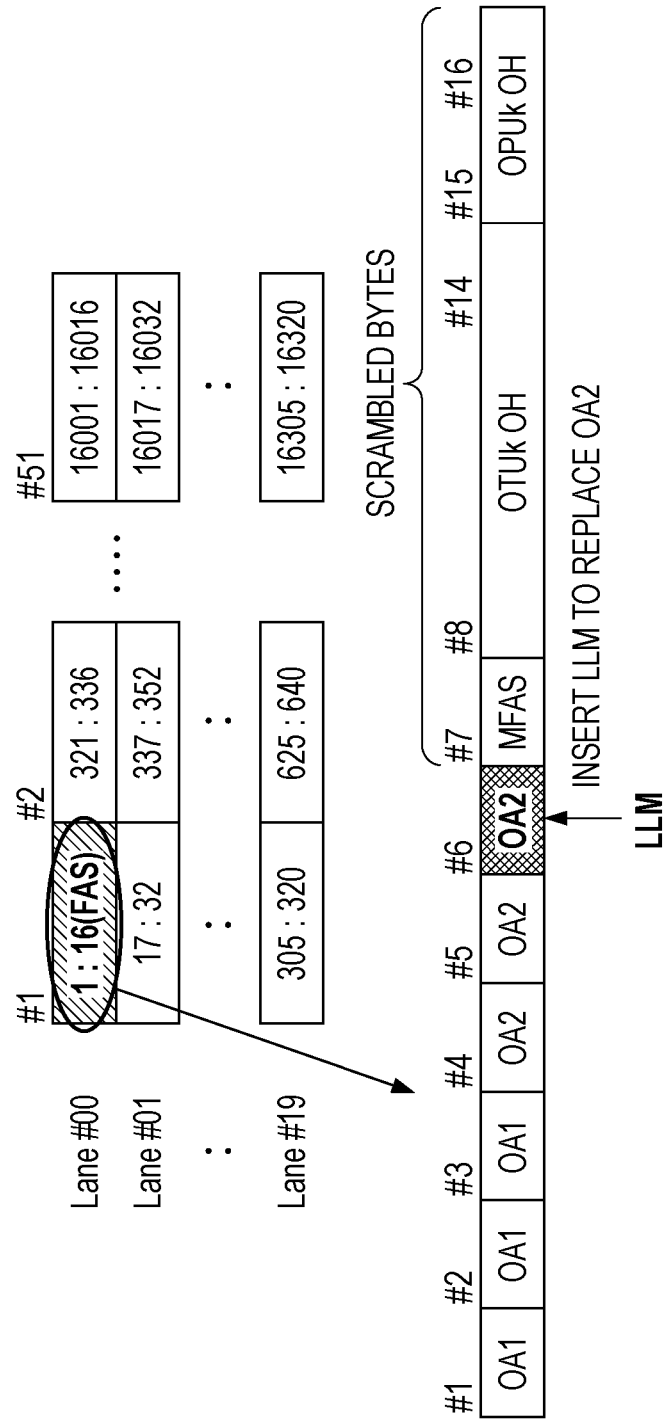
FIG. 6 illustrates an example of lane ID insertion which is performed by the frame former in FIG. 3.

Referring back to FIG. 3, the lane ID insert unit 53 inserts LLM (Logical Lane Marker) for lane alignment at the 6th byte of the leading section FAS (Frame Alignment Signal) of the OTU frame. FAS is a bit string for frame synchronization. FIG. 6 illustrates insertion of lane ID. LLM is inserted at the 6th byte, OA2 of the pattern for synchronization, which is started with OA1, OA1, OA1, OA2, OA2, and OA2. The above LLM is used as the lane ID. For example, the insertion point is incremented by one from 0 to 239 when LLM is inserted, and is returned to 0 and continued to be incremented.

The lane rearrangement unit 54 rearranges the order of N sequences of multi-lane, each having an inserted lane ID, at random. Lane rearrangement is made according to a lane rearrangement index which is generated by the random number generator 25 (see FIG. 1). The random number generator 25 may be any hardware random number generator. For example, a plurality of oscillators, in each of which odd number of NOT gates (inverters) are connected together in a ring form, are arranged, and the output of each oscillator is connected to an XOR gate. A random number is generated by sampling an XOR output of a plurality of large jitters from the oscillators with a fixed clock cycle.

Figure 7:
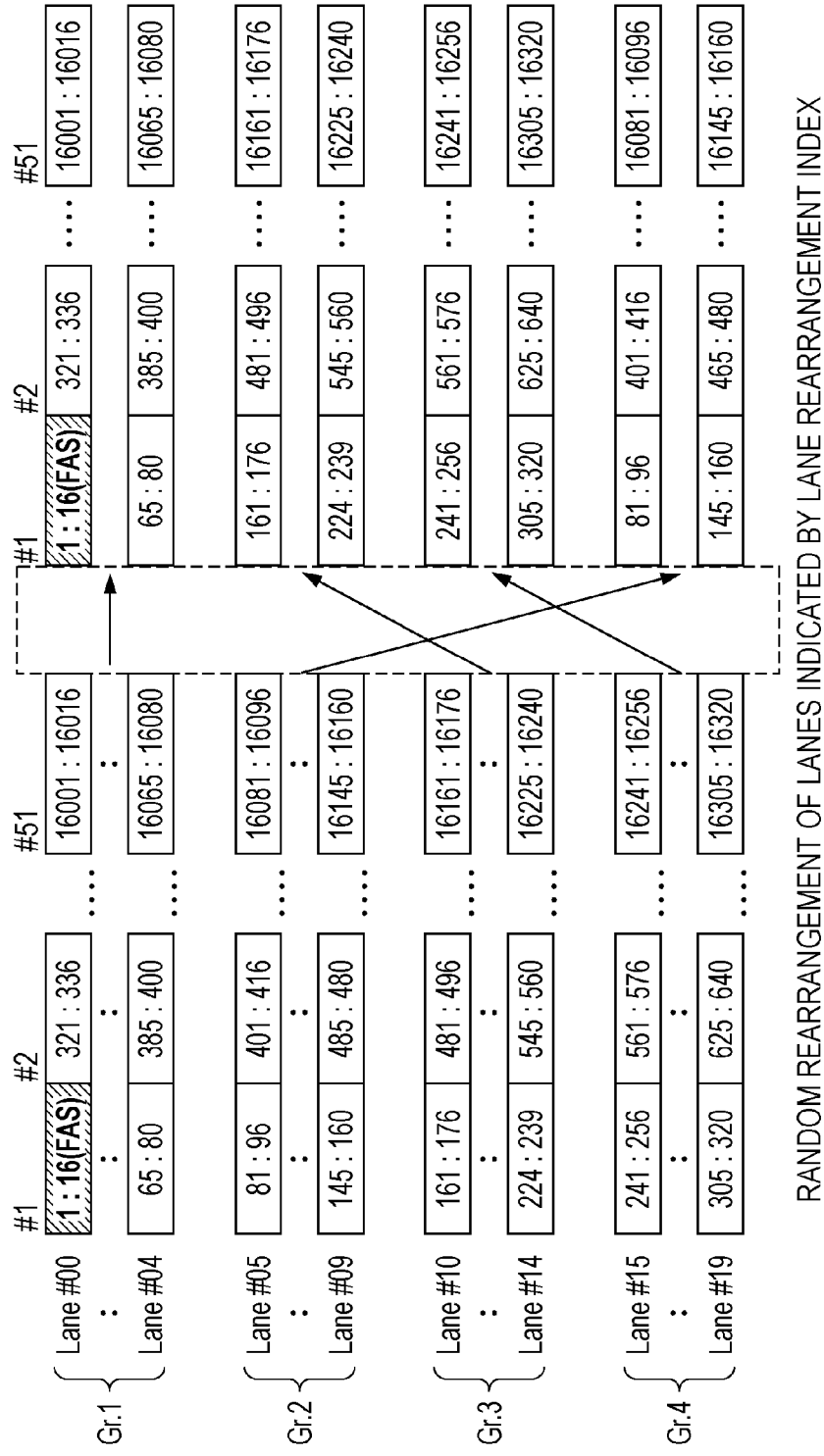
FIG. 7 illustrates an example of lane rearrangement which is performed by the frame former in FIG. 3.

FIG. 7 illustrates an example of lane rearrangement. In this example, 20 lanes are divided into 4 groups, and random rearrangement is made between the groups. Group 1 including lanes #00 to #04 is located at the first to fifth sequences which are the same as before the rearrangement. Group 2 including lanes #05 to #09 is arranged at the 16th to 20th sequences after the rearrangement process. Group 3 including lanes #10 to #14 is arranged at the 6th to 10th sequences after the rearrangement process. Group 4 including lanes #15 to #19 is arranged at the 11th to 15th sequences after the rearrangement process.

In this example, the lanes are divided into 4 groups, and thus there are 4!=4×3×2×1=24 patterns of rearrangement. A lane rearrangement index is assigned to each of the 24 patterns. That is to say, the random number generator 25 in FIG. 1 generates a value indicating one of 24 patterns at random with a predetermined time interval. The lane rearrangement index is updated once for every N×M frames. In the above example where N=20 lanes and M=6, the lane rearrangement index is updated once for every 20×6=120 frames. It is assumed that the receiving device is previously informed of the correspondences between 24 rearrangement patterns and lane rearrangement indices.

In this manner, the positions of each component included in the client data are rearranged periodically, and thus even if the client data is wiretapped, the content of data may not be reconstructed unless information for reconstructing the original lane order and timing for the reconstruction are obtained. It is to be noted that N sequences of lane may not be divided into groups in the lane rearrangement, and N sequences of lane may be rearranged. In this case, the random number generator 25 generates values indicating N! patterns at random.

Figure 8:
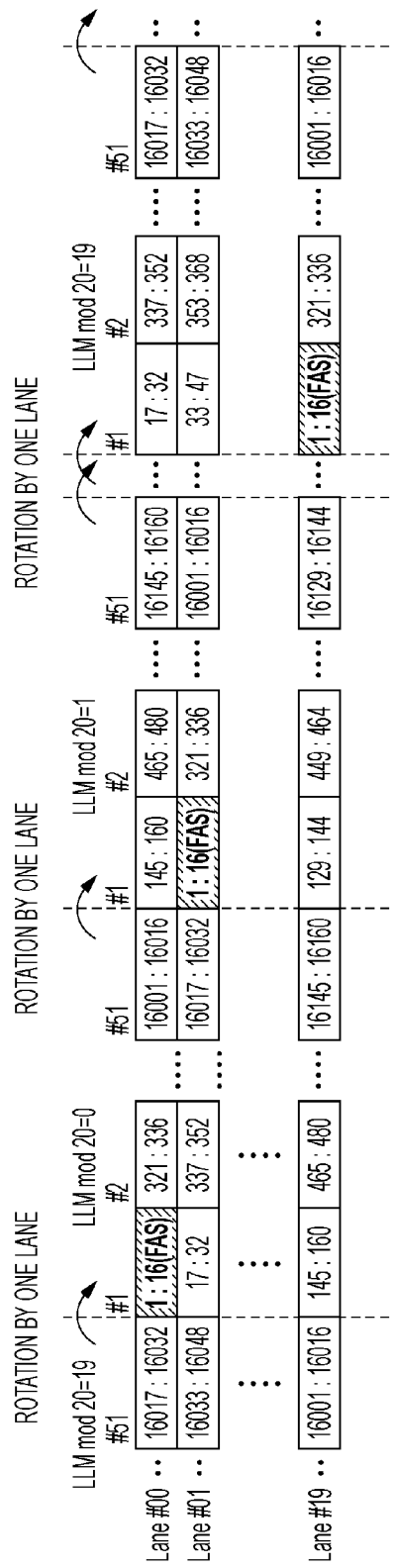
FIG. 8 illustrates an example of lane rotation which is performed by the frame former in FIG. 3.

Returning to FIG. 3, the lane rotation unit 55 rotates the lane positions for each OTU frame. By this processing, FAS, which is a bit string for synchronization, is made to be present in the all lanes. FIG. 8 illustrates an example of lane rotation. The leftmost lane #19 in FIG. 8 is the data at the end of the previous OTU frame. FAS is arranged at the head of the lane #00 in the current OTU frame. As described above, this is the lane arrangement after the order of the lanes is rearranged. In the subsequent OTU frame, FAS is arranged at the lane #01. In the further subsequent OTU frame, FAS is arranged at the lane #02. By the above rotation, a byte for frame synchronization and a lane ID are distributed to all the lanes.

Referring back to FIG. 3, the N:4 gearbox 56 transforms N sequences of lane, which have undergone a lane rearrangement and a lane rotation, into 4 sequences. The conversion is illustrated in FIG. 9. The 20 sequences of lane are transformed to 4 sequences by 5:1 bit MUX #1 to #4. When N is not a multiple of 4, N sequences are transformed to K sequences in parallel where K is the least common multiple of 4 and N, and the k sequences are transformed to 4 sequences by (K/4):1 multiplexer. For example, when N=10, N sequences are transformed to two sets of N sequences in parallel, and then transformed to 4 sequences by 5:1 multiplexer with K=20. The output of the N:4 gearbox 56 serves as the output of the frame former 22.

Figure 10A:
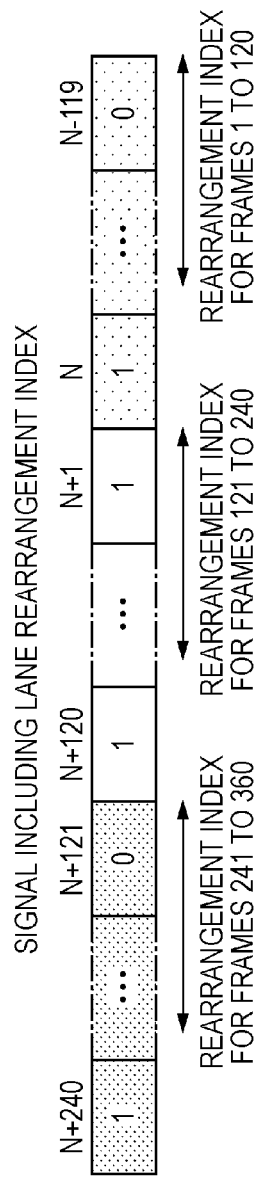
FIGS. 10A to 10C illustrate an example of a configuration of a lane forming index signal generated by a signal processing circuit in FIG. 1, an example of a configuration of a differential symbol generated by the signal processing circuit in FIG. 1, and an example of a configuration of a frequency offset signal generated by the signal processing circuit in FIG. 1, respectively.
Figure 10B:
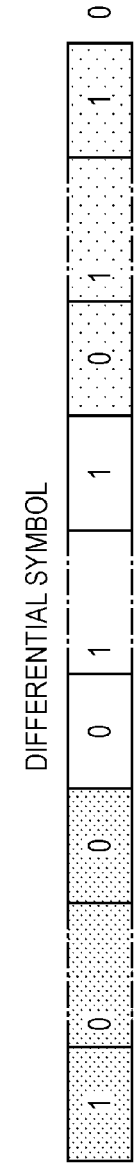
Figure 10C:

FIGS. 10A to 10C illustrate the relationship between the lane rearrangement index signal generated by the random number generator 25 of the transmission signal processing unit 20 in FIG. 1, and the frequency offset signal generated by the carrier controller 26. A lane rearrangement signal in FIG. 10A is a signal supplied to the carrier controller 26 from the random number generator 25. As described above, the lane rearrangement pattern is updated for every N×M frames (for example, 20×6=120 frames). Indices N−119 to N are rearranged indices of the frames 1 to 120. Indices N+1 to N+120 are rearranged indices of the frames 121 to 240. Indices N+121 to N+240 are rearranged indices of the frames 241 to 360.

FIG. 10B illustrates a differential symbol which is a difference between the current bit and the bit at one symbol time before. For example, 1 indicates a bit which has changed, and 0 indicates a bit which has not changed. The frequency offset signal in FIG. 10C expresses a value "1" of differential symbol as a frequency offset amount $+\Delta f/2$, and expresses a value "0" of differential symbol as a frequency offset amount $-\Delta f/2$.

FIG. 11 illustrates the phase/intensity process by the phase/intensity mapping unit. The data which has been rearranged at random by the frame former 22 is inputted to the phase/intensity mapping units 23-1 and 23-2 with four rows (Xi component, Xq component, Yi component, Yq component). The phase/intensity mapping units 23-1 and 23-2 maps the data preceding 120 frames to an optical phase ($+\Delta f/2$ or $-\Delta f/2$) according to a lane rearrangement index. The block of the oblong rectangle of each frame is a stripe with 16 bytes, i.e., 128 bits.

Attention is focused on one bit among 16 bytes (128 bits). When a bit of an index signal has changed from the previous value, a signal point 50a is mapped to a signal point 50b which has undergone a phase rotation (offset) of $+\Delta f/2$. An argument is expressed by $\text{Arg}\{\exp(j\pi\Delta fT)\}$ where T is a symbol time. When a phase/intensity mapping is performed, one bit is converted to an analog value with six bits.

A digital signal on which a lane rearrangement index as a frequency offset (phase rotation of the wavelength of transmitted light) is mapped is supplied to the DACs 11-1 to 11-4 (see FIG. 1) to be converted to an analog signal. The drivers 12-1 to 12-4 each generate an electrical drive signal according to a client signal, and drive the optical electric field modulators 13-1 and 13-2. The optical electric field modulators 13-1 and 13-2 each modulate a carrier wave from the light source 15 with a drive signal, and combined optical signal is outputted to the optical transmission line.

FIG. 12 illustrates the signal processing flow which is performed by the transmission signal processing unit 20 of the optical transmitter 10. In step S101, the OTU frame generator 21 generates an OTU frame from a client signal. In step S103, the frame former 22 generates N sequences of multi-lane by striping/demultiplexing for every 16 bytes, and replaces part of the bytes for frame synchronization with a lane ID. As described above with reference to FIG. 6, an LLM (Logical Lane Marker) is inserted at the 6th byte of FAS in the embodiment.

In step S105, the frame former 22 generates a lane rearrangement index signal for every N×M frames, and rearranges the order of N sequences of multi-lane at random. In step S107, the lanes are rotated for each OTU frame, so that a byte for frame synchronization and a lane ID are distributed to all lanes. In step S109, the carrier controller 26 generates a frequency offset signal corresponding to a frequency lane rearrangement index, and the phase/intensity mapping units 23-1 and 23-2 each map transmission data to an optical phase which has undergone phase rotation of ($\pm\Delta f/2$) corresponding to $\Delta f$. The digital signal is converted to an analog signal, which is electro-optically modulated to be transmitted.

With the above transmission signal processing method, concealment using the layers 0, 1 is achieved, and thus both data concealment and low latency are achieved.

<Signal Processing of Receiving Device>

Figure 13:
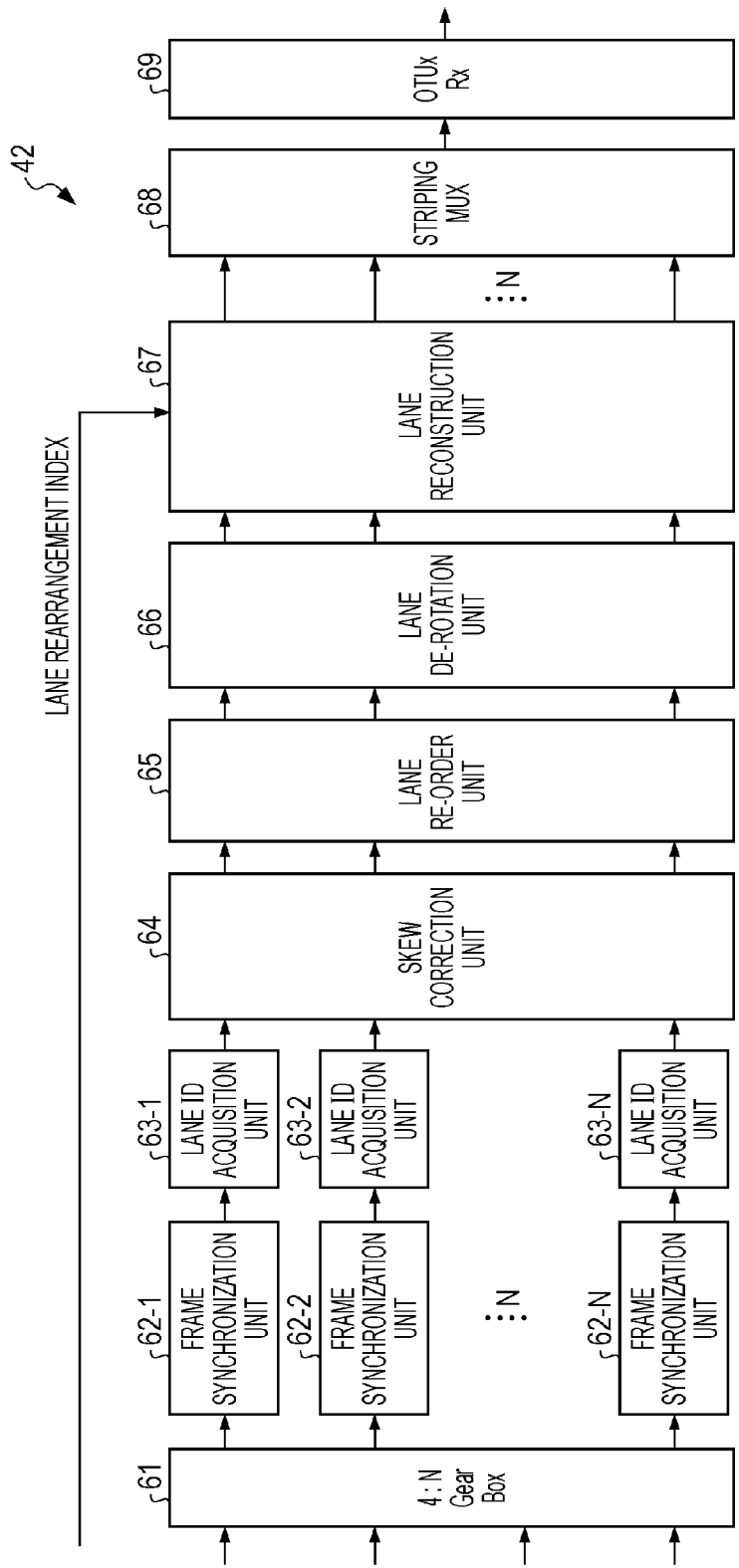
FIG. 13 is a schematic configuration diagram of a frame reformer in a reception signal processing unit of the optical receiver in FIG. 2.

Hereinafter, the operation of the optical receiver 30 in FIG. 2 will be described with reference to FIGS. 13 to 21. FIG. 13 illustrates a configuration example of the frame reformer 42 of the reception signal processing unit 40. The frame reformer 42 includes a 4:N gearbox 61, frame synchronization units 62-1 to 62-N, lane ID acquisition units 63-1 to 63-N, a skew correction unit 64, a lane re-order unit 65, a lane de-rotation unit 66, a lane reconstruction unit 67, a striping multiplexer 68, and an OTU receiver 69.

The 4:N gearbox 61 receives an input of digital receive data with a frequency offset removed. As described above with reference to FIG. 2, a frequency offset is estimated based on a receive signal which has undergone polarization/phase separation, photoelectric conversion, and analog-to-digital conversion, so that the frequency offset of the receive signal is compensated. Along with the above process, a signal indicating a lane rearrangement index from the frequency offset is extracted and supplied to the lane reconstruction unit 67.

FIGS. 14A to 14C respectively illustrate a frequency offset signal, differentiation, which are detected by the frequency offset estimation unit 43, and a lane rearrangement index signal which is reconstructed based on the frequency offset signal and the differentiation. The lane rearrangement index information is superimposed on the data preceding 120 frames as a frequency offset and reaches the optical receiver 30. FIG. 14A illustrates an offset signal detected by the frequency offset estimation unit 43. In general, a frequency offset is a difference between the frequency of the light source 15 of the optical transmitter 10, and the frequency of the light source 35 of the optical receiver 30. However, in the embodiment, an optical frequency to be transmitted includes an offset amount which indicates a lane rearrangement index. Therefore, the frequency offset by the frequency offset estimation unit 43 also includes the offset amount $\pm\Delta f/2$ corresponding to the lane rearrangement index. The frequency offset estimation unit 43 performs a differential operation by calculating a difference between frequency offsets as illustrated in FIG. 14B. In addition, a lane rearrangement index signal is reconstructed from the differential offset as illustrated in FIG. 14C. When the differential offset is $+\Delta f/2$, the value of the lane rearrangement index is set to "1", and when the differential offset is $-\Delta f/2$, the value of the lane rearrangement index is set to "0".

In this manner, compensation of frequency offset, which is performed by normal reception signal processing, is made, and also a lane rearrangement index included in the frequency offset component may be extracted. Because compensation of a frequency variation is made at an initial stage of digital signal processing, rearrangement of multi-lane may be acquired by the frame reformer 42 before reconstruction of data.

Figure 15A:
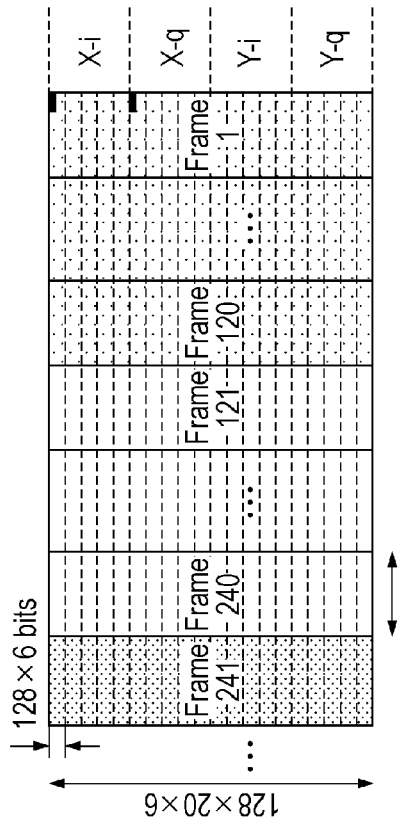
FIGS. 15A and 15B illustrate an example of frequency offset removal performed by the reception signal processing unit in FIG. 2, and mapping determination performed by the reception signal processing unit in FIG. 2, respectively.
Figure 15B:
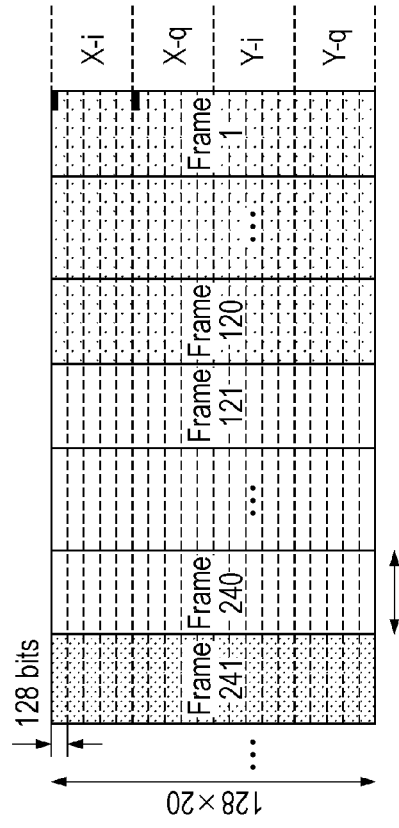

FIGS. 15A and 15B illustrate receive data after frequency offset removal, and data after mapping determination, respectively. FIG. 15A includes an analog value in 6 bits, and FIG. 15B illustrates data which is converted to one bit data according to determination of a signal component by demapping.

Figure 16:
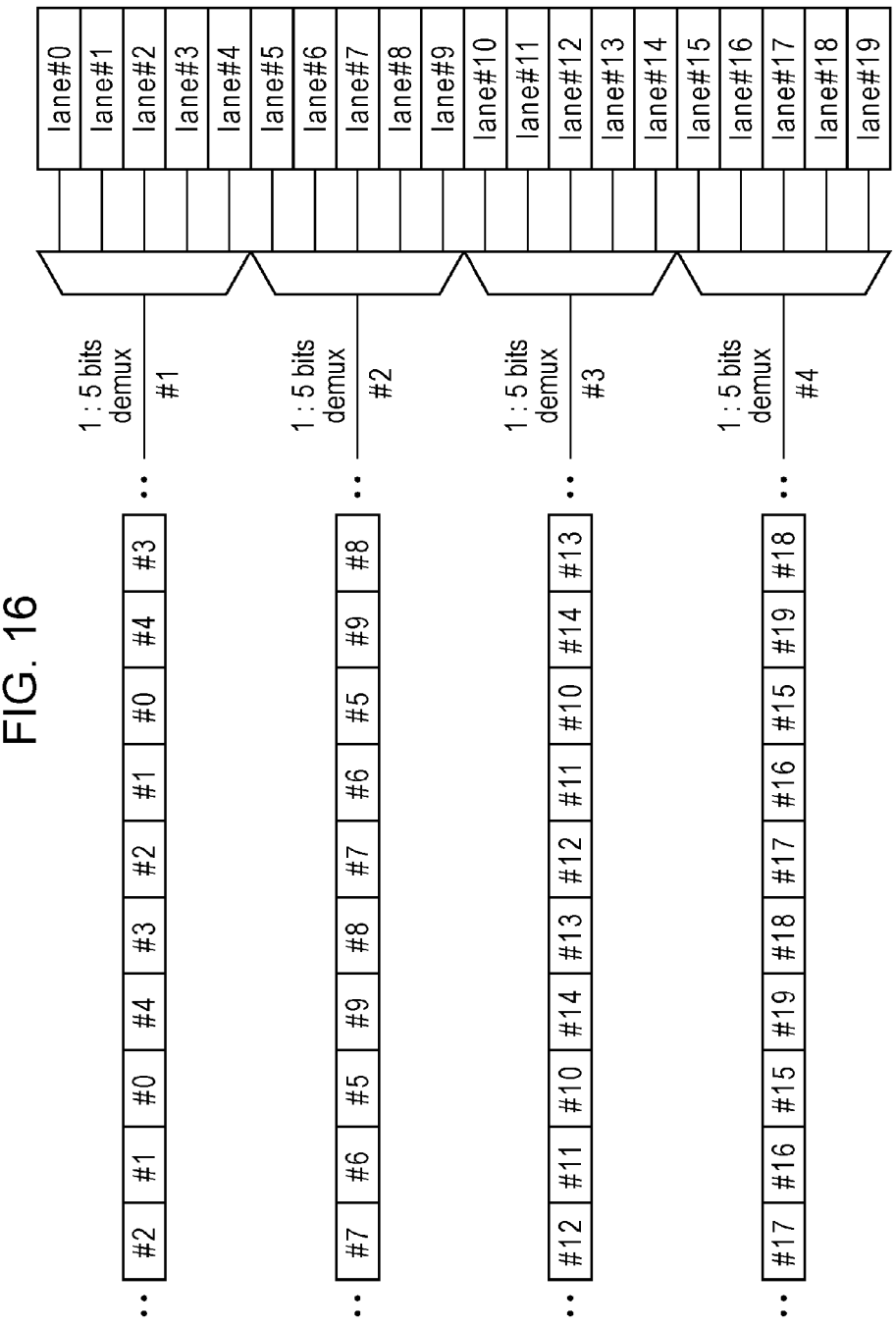
FIG. 16 illustrates an example of a signal inputted to the frame reformer in FIG. 2.

FIG. 16 illustrates a configuration example of the 4:N gearbox 61 in FIG. 13. The 4:N gearbox 61 transforms 4 digital data sequences to N digital data sequences, the 4 digital data sequences being inputted from the frequency offset compensators 41-1 and 41-2. In the example of FIG. 16, 4 sequences of input signal are transformed to 20 lanes (lanes #0 to #19) in parallel using 1:5 bit demultiplexers #1 to #4. When N is not a multiple of 4, the 4:N gearbox 61 transforms 4 sequences of input signal to k sequences in parallel where K is the least common multiple of 4 and N (in this case, 1:(K/4) demultiplexer is used). Subsequently, k sequences are transformed to N sequences by (K/N):1 multiplexer. For example, when N=10, N sequences are transformed to 20 sequences in parallel by a 1:5 demultiplexer, and then transformed to 10 sequences by a 2:1 multiplexer.

Referring back to FIG. 13, the frame synchronization units 62-1 to 62-N each perform frame synchronization using 5th byte of the leading section FAS of each of respective OTU frames which appear in corresponding lanes (lanes #0 to #19). The lane ID acquisition units 63-1 to 63-N each acquire an LLM (Logic Lane Marker) in the 6th byte of FAS. The skew correction unit 64 compensates skew of each lane with a lane ID.

Figure 17:
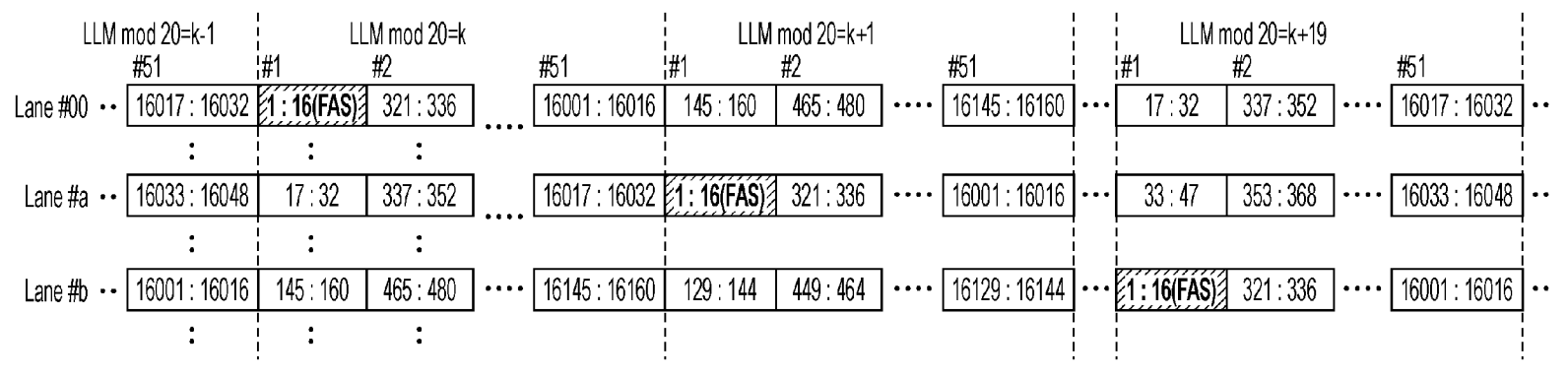
Figure 18:
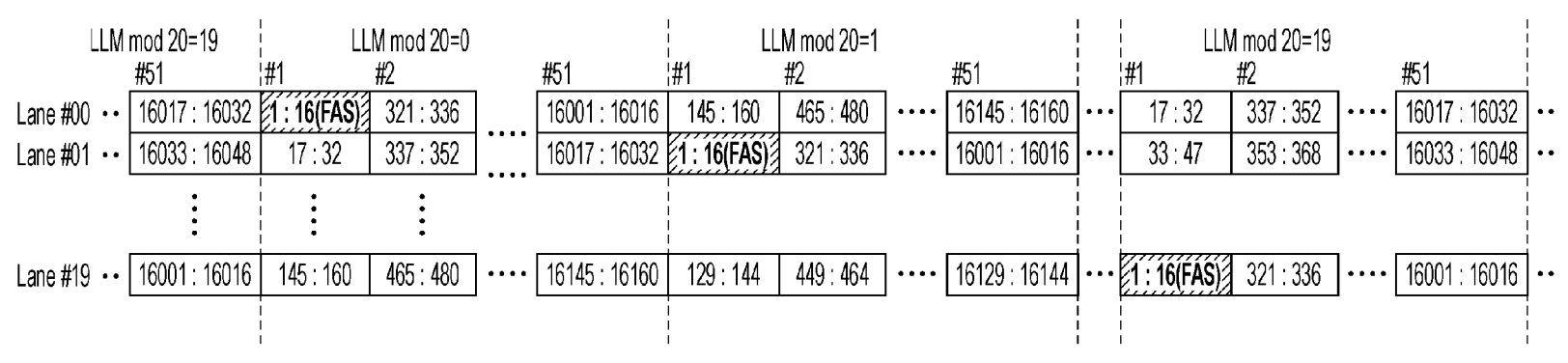

FIG. 17 illustrates a manner how frame synchronization is performed for each lane, a lane ID is acquired, and skew correction is performed. Synchronization is performed for each lane, and thus delay due to arrival time is compensated and 20 lanes are aligned. However, lane ID appear in an order different from the order at the time of transmission depending on a state of the transmission line. Thus, the lane re-order unit 65 in FIG. 13 rearranges lanes in the order of lane ID as illustrated in FIG. 18.

Figure 19:
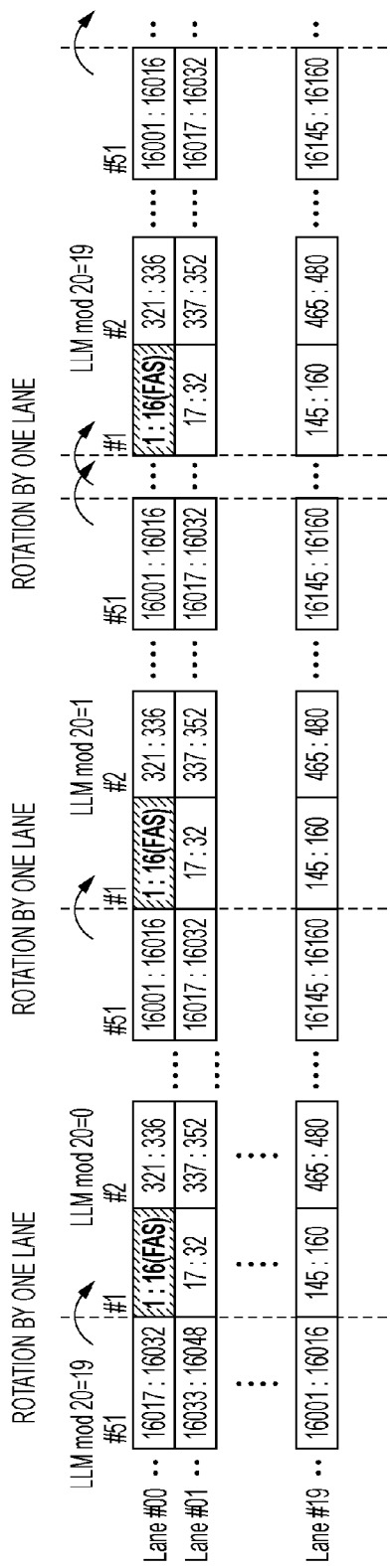
FIG. 19 illustrates an example of lane de-rotation.

Referring back to FIG. 13, the lane de-rotation unit 66 de-rotates lanes one by one for each OTU frame as illustrated in FIG. 19. Accordingly, each OTU frame returns to an original state before a lane ID is assigned to each lane.

The lane reconstruction unit 67 rearranges lane positions for every N×M frames (20×6=120 frames in this example) according to a lane rearrangement index sent from the frequency offset estimation unit 43, and thus reconstructs the original state. The lane rearrangement patterns which have one-to-one correspondence with the rearrangement indices may previously stored in a table (not illustrated). In this case, the lane reconstruction unit 67 reads a rearrangement pattern corresponding to a lane rearrangement index from the table, and reconstructs the original lane order.

Figure 20:
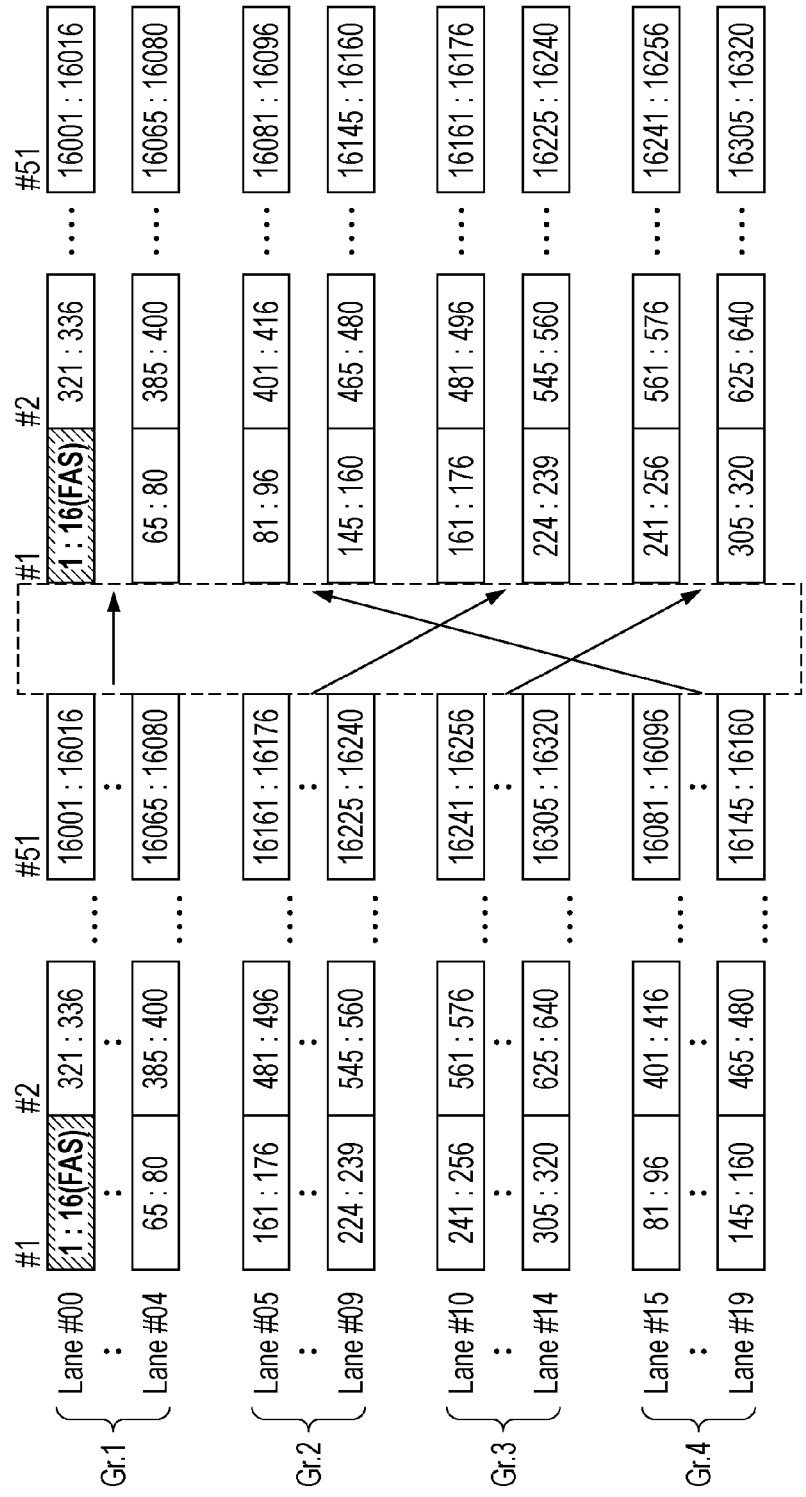
FIG. 20 illustrates an example of lane rearrangement indicated by a lane forming index.

In the embodiment, 20 lanes are divided into 4 groups and rearrangement (shuffle) is made between the groups by the transmitting device, and thus lane rearrangement is made between groups by the receiving device, too. The above processing is illustrated in FIG. 20. In FIG. 20, the lanes included in group 1 are arranged in lanes #00 to #04. The lanes included in group 2 are rearranged in lanes #10 to #14. The lanes included in group 3 are rearranged in lanes #15 to #19, and the lanes included in group 4 are rearranged in lanes #05 to #09. Accordingly, the lanes return to the state before the rearrangement of FIG. 7. It is to be noted that lanes may not be divided into groups as described above.

The striping multiplexer 68 performs striping/demultiplexing for every 16 bytes, and reforms the OTU frame illustrated in FIG. 4 from the data of N sequences (20 lanes). The striping multiplexer 68 serves as a serial converter. The OTU receiver 69 supplies an OTU frame to the OTU frame receiver 44 (FIG. 2).

Figure 21:
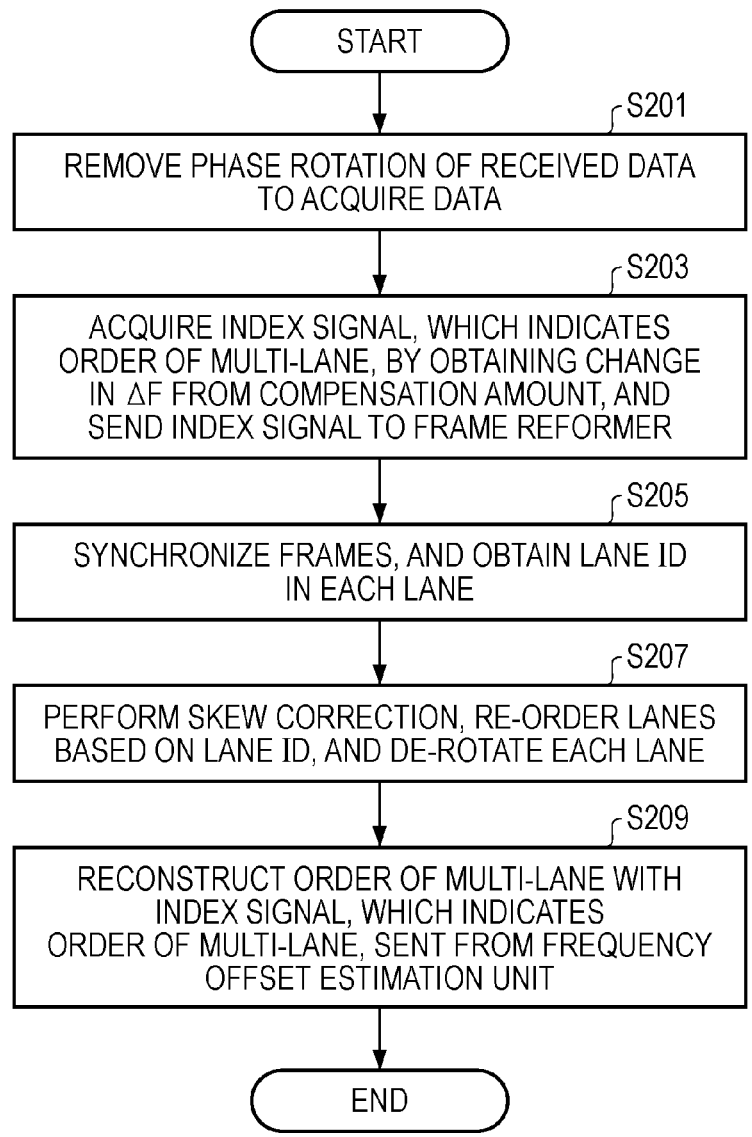
FIG. 21 is a flowchart illustrating signal processing performed by the reception signal processing unit in FIG. 2.

FIG. 21 illustrates a signal processing flow which is performed by the reception signal processing unit 40 of the optical receiver 30. In step S201, the frequency offset estimation unit 43 estimates a frequency offset (phase rotation), and the frequency offset compensators 41-1 and 41-2 each remove the phase rotation of receive data to obtain compensated data. In step S203, the frequency offset estimation unit 43 extracts an index signal indicating an order of multi-lane by acquiring a change in Δf based on a compensation amount, and informs the frame reformer 42 of the index signal. Steps S201 and S203 may be performed at the same time. In step S205, after the frame synchronization units 62-1 to 62-N perform frame synchronization for each lane, the lane ID acquisition units 63-1 to 63-N each acquire a lane ID. In step S207, the skew correction unit 64 performs skew correction based on the lane ID, and the lane re-order unit 65 rearranges the lanes in the order of lane ID. Furthermore, the lane de-rotation unit 66 de-rotates the lanes one by one. In step S209, the lane reconstruction unit 67 reconstructs the original order of multi-lane in accordance with a lane rearrangement index sent from the frequency offset estimation unit 43.

Optical communication using the optical transmitter 10 and the optical receiver 30 in the embodiment has the following effects.

(a) Because the order of lanes is periodically changed when a serial signal sequence is formed into multi-lane using multi-lane transfer of an OTU frame, concealment using a low layer is achieved without changing the basic configuration of the circuit.

(b) Because an index indicating a changed order of the lanes is sent as a frequency offset of a transmission signal, rearrangement information along with the transmission data may be sent.

(c) Because the receiving device simultaneously receives the transmission data and a lane rearrangement index information data superimposed on the transmission data, the transmission data and the lane rearrangement index are processed in the same circuit, and thus synchronization may be performed easily. (In contrast to the above, when a lane rearrangement index is sent on a monitor signal having another wavelength to the optical receiver 30, latency processing using a fiber length and synchronization processing are to be performed separately).

(d) Because the receiving device may extract a lane rearrangement index simultaneously with performing compensation of the frequency offset, data may be reconstructed using the lane rearrangement index.

(e) It is desirable that the receiving device knows the correspondence of the lane rearrangement indices and the rearrangement patterns beforehand, however, the order of the multi-lane is periodically updated, and thus concealment of the signal is maintained.

(f) Because both the transmitting device and the receiving device may utilize general rotation/de-rotation of multi-lane and a re-order circuit, a significant change or increase in circuit scale does not occur.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmitter comprising:
a demultiplexer configured to divide a data frame of a transmission signal into subframes with a predetermined length so as to form the subframes in signal lanes;
an index generator configured to generate an index indicating an order of the signal lanes;
a lane rearrangement unit configured to rearrange the order of the signal lanes according to the index;
a carrier controller configured to generate a frequency offset of a carrier corresponding to the index;
a mapping unit configured to map the transmission signal in the plurality of signal lanes with the rearranged order to the carrier of the transmission signal with a phase corresponding to the frequency offset; and
a transmitting unit configured to optically modulate the mapped transmission signal so as to transmit the modulated transmission signal.

2. The optical transmitter according to claim 1, wherein the index is updated for every N×M frames, wherein N is a number of the signal lanes and M is an integer.

3. The optical transmitter according to claim 2, wherein the index is superimposed on data preceding the N×M frames as the frequency offset.

4. The optical transmitter according to claim 1, further comprising:
a lane ID insertion unit configured to insert a lane ID for identifying a signal lane in a synchronous frame of the divided data frame; and
a lane rotation unit configured to rotate the signal lanes after the rearrangement of the signal lanes so as to change a signal lane having the synchronous frame to which the lane ID is inserted.

5. The optical transmitter according to claim 1, wherein the lane rearrangement unit is configured to divide the signal lanes into a plurality of groups so as to rearrange the signal lanes in the group units.

6. An optical receiver comprising:
a receiving unit configured to receive a signal on which an index indicating an order of signal lanes is superimposed as a frequency offset, wherein the order of the signal lanes is designated by an optical transmitter;
a frequency offset estimation unit configured to detect the frequency offset from the received signal so as to calculate a lane rearrangement index based on the frequency offset, wherein the lane rearrangement index corresponds to the index;
a signal sequence transformation unit configured to transform the received signal to a the signal lanes;
a lane reconstruction unit configured to reconstruct the signal lanes according to an original order by rearranging an order of the signal lanes based on the lane rearrangement index; and
a multiplexer configured to reform a data frame by serially converting the signal in the reconstructed signal lanes.

7. The optical receiver according to claim 6, further comprising:
a frequency offset compensator configured to compensate the frequency offset of the received signal, based on the detected frequency offset,
wherein the signal sequence transformation unit is configured to form the received signal, for which the frequency offset has been compensated, in the signal lanes.

8. The optical receiver according to claim 6, further comprising:
a lane ID acquisition unit configured to acquire a lane ID for identifying a signal lane from each of the signal lanes; and
a de-rotation unit configured to de-rotate the signal lanes rotated by the optical transmitter, based on the acquired lane ID,
wherein the reconstruction of the signal lanes by the lane reconstruction unit is performed after the de-rotation of the signal lanes by the de-rotation unit.

9. The optical receiver according to claim 6, wherein the lane rearrangement index is superimposed on data preceding N×M frames, wherein N is a number of the signal lanes and M is an integer.

10. The optical receiver according to claim 6, wherein the lane reconstruction unit is configured to divide the signal lanes into a plurality of groups so as to rearrange the signal lanes in the group units.

11. An optical transmission method comprising:
dividing a data frame of a transmission signal into subframes with a predetermined length so as to form the subframes in signal lanes;
generating an index indicating an order of the signal lanes;
rearranging the order of the signal lanes according to the index;
generating a frequency offset of a carrier corresponding to the index;
mapping the transmission signal in the signal lanes with the rearranged order to the carrier of the transmission signal with a phase corresponding to the frequency offset; and
optically modulating the mapped transmission signal so as to transmit the modulated transmission signal.

12. The optical transmission method according to claim 11, further comprising:
receiving a signal including the frequency offset;
detecting the frequency offset from the received signal;
calculating the index based on the frequency offset;
transforming the received signal to the signal lanes; and
reconstructing the signal lanes according to an original order of the signal lanes by rearranging an order of the signal lanes based on the index so as to reform the data frame, by an optical receiver.

13. The optical transmission method according to claim 11, further comprising
updating the index for every N×M frames, wherein N is a number of the signal lanes and M is an integer.

14. The optical transmission method according to claim 13, wherein the index is superimposed on data preceding the N×M frames as the frequency offset and transmitted to the optical receiver.

15. The optical transmission method according to claim 11, further comprising:
inserting a lane ID in a synchronous frame of the divided data frame;
rotating the signal lanes after the rearranging of the signal lanes so as to change a signal lane having the synchronous frame to which the lane ID is inserted.

16. The optical transmission method according to claim 12, further comprising:
compensating the frequency offset of the received signal based on the detected frequency offset,
wherein the transforming of the received signal forms the received signal, for which the frequency offset has been compensated, in the signal lanes.

17. The optical transmission method according to claim 12, further comprising:
acquiring a lane ID for identifying a signal lane from each of the signal lanes; and de-rotating the signal lanes rotated by the optical transmitter, based on the acquired lane ID,
wherein the reconstruction of the signal lanes is performed after the de-rotation of the signal lanes.

18. The optical transmission method according to claim 12, wherein the index transmitted from the optical transmitter is received with the data preceding N×M frames, wherein N is a number of the signal lanes and M is an integer.

19. The optical transmission method of claim 11, wherein the hardware processor divides the signal lanes into a plurality of groups so as to rearrange the signal lanes in group units.

* * * * *

UNITED STATES PATENT AND TRADEMARK OFFICE
CERTIFICATE OF CORRECTION

| | | |
|---|---|---|
| PATENT NO. | : 9,148,229 B2 | Page 1 of 1 |
| APPLICATION NO. | : 13/779791 | |
| DATED | : September 29, 2015 | |
| INVENTOR(S) | : Kosuke Komaki | |

It is certified that error appears in the above-identified patent and that said Letters Patent is hereby corrected as shown below:

IN THE CLAIMS

Claim 6, Column 11, Line 51

Delete "a the" and insert --the--, therefor.

Signed and Sealed this
Eighth Day of December, 2015

Michelle K. Lee
*Director of the United States Patent and Trademark Office*